(12) United States Patent    (10) Patent No.: US 8,196,549 B2
Seagraves                    (45) Date of Patent: Jun. 12, 2012

(54) ADJUSTABLE ANIMAL WATERING SYSTEM

(75) Inventor: John Seagraves, Hull, GA (US)

(73) Assignee: Merial Limited, Duluth, GA (US)

( * ) Notice: Subject to any disclaimer, the term of this patent is extended or adjusted under 35 U.S.C. 154(b) by 1049 days.

(21) Appl. No.: 12/113,483

(22) Filed: May 1, 2008

(65) Prior Publication Data

US 2008/0271678 A1    Nov. 6, 2008

Related U.S. Application Data

(60) Provisional application No. 60/927,381, filed on May 3, 2007.

(51) Int. Cl.
*A01K 39/00* (2006.01)
(52) U.S. Cl. ............ 119/477; 119/72; 119/475
(58) Field of Classification Search ............ 119/51.11, 119/72, 72.5, 454, 456, 457, 464, 475, 476, 119/477
See application file for complete search history.

(56) References Cited

U.S. PATENT DOCUMENTS

| 4,173,948 | A | | 11/1979 | Austin |
| 4,348,989 | A | * | 9/1982 | Vik |
| 4,884,528 | A | * | 12/1989 | Steudler, Jr. ............ 119/72.5 |
| 5,048,462 | A | * | 9/1991 | Hostetler ............ 119/72 |
| 5,660,139 | A | * | 8/1997 | Hostetler ............ 119/72.5 |
| 5,765,506 | A | | 6/1998 | Hawk et al. |
| 5,794,563 | A | * | 8/1998 | Klepac ............ 119/57.91 |
| 2005/0066907 | A1 | | 3/2005 | Pollock et al. |

* cited by examiner

*Primary Examiner* — Rob Swiatek
*Assistant Examiner* — Ebony Evans
(74) *Attorney, Agent, or Firm* — Judy Jarecki-Black; Chad Kitchen; Merial Limited

(57) ABSTRACT

The assemblies of the invention are suitable for mounting to, or being an integral part of, an animal enclosure such that the height of a valve-controlled liquid outlet may be adjusted according to the changing needs of growing animals. The adjustable liquid delivery assemblies comprise an elongated rail, a liquid delivery unit having at least one liquid delivery head slideably engaged with the elongated rail, a flexible liquid delivery tube for connecting a liquid delivery head to a liquid source, and a means for securing the liquid delivery unit at a selected position on the elongated rail.

15 Claims, 13 Drawing Sheets

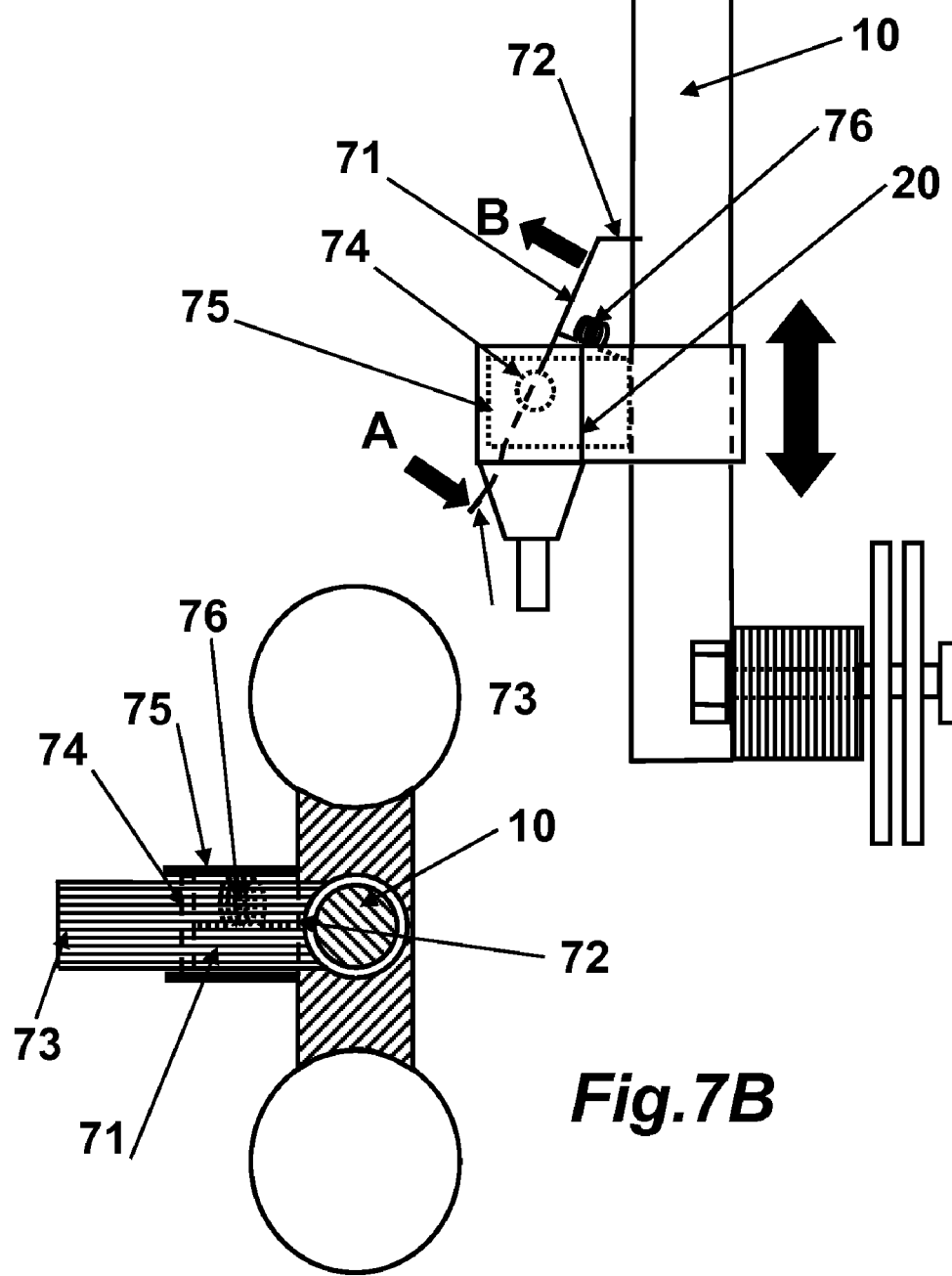

ADJUSTABLE ANIMAL WATERING SYSTEM

INCORPORATION BY REFERENCE

This application claims benefit of U.S. provisional patent application Ser. No. 60/927,381 filed May 3, 2007.

All documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF THE INVENTION

The present invention relates to adjustable liquid deliver systems for delivering liquid to animals. The invention further relates to animal enclosures comprising an adjustable liquid deliver system according to the invention.

BACKGROUND OF THE INVENTION

The provision of a ready supply of drinking water is a necessity in the rearing of animals. Smaller animals are typically enclosed in cages, small pens or boxed enclosures. For example, mice and rats are often reared under controlled conditions by maintaining the animals in rearing containers that are essentially plastic boxes. Infant or juvenile rodents are usually nursed by the mother and then weaned to feeding and drinking on their own. During the growth period, the height of mouse and rat mouths, as measured from the floor of the box, do not significantly increase. Such animals are also capable of rearing up on their hind legs to reach a water supply, which is most often an inverted bottle and a descending tube from which a drink may be taken.

Poultry rearing, however, presents a problem since newly hatched chicks do not take nourishment or water from the mother but are able to eat solid food and drink water from the moment they leave the egg. Thus, a readily available water supply must be constantly provided. It is well known in the art, therefore, to install in poultry rearing cages or containers a device such as a gravity valve liquid delivery head connected to a water source. For this type of device to function, the bird must typically push upwards a protruding extension of the valve, thereby opening the valve and delivering water until the bird releases the pressure on the valve. Gravity then causes the valve to descend, cutting off the liquid flow. Since the valve operates by gravity, the bird must place it's beak under the liquid delivery head to push the valve upwards. However, growth of the chicks will quickly mean that a drinking valve at a height suitable for use by newly hatched or young chicks will become too low for older birds to easily operate. At best, the birds will have to strain to reach the valve, or even crouch to place their beaks below the delivery heads.

It is necessary, therefore, to regularly adjust the height of the water delivery heads to accommodate the growing birds, and to lower the drinking units when a fresh batch of chicks is introduced to the cages. Cage rearing of poultry can involve multiple cage units, each of which must have the drinking supply adjusted, which is a labor and cost intensive activity. A variety of adjustable drinking systems have been developed requiring different degrees of labor input. In addition, many of these apparatus are structured in such a way that they may harbor waste or infections contaminant material that may be difficult to access for removal, an essential requirement to prevent potentially devastating infections of flocks.

Adjustable height watering devices include such as U.S. Pat. Nos. 4,724,797 and 4,884,528 to Steudler, Jr. consisting of a liquid delivery head or nipple directly attached to a water supply pipe wherein the entire pipe may be height adjusted by a rapid release hook or the delivery head is rigidly attached to the cage or container. Another example, as described in U.S. Pat. No. 5,765,506 to Hawk & Cron, comprises a waterer fed from a supply tube. Channels in the waterer slideably engage with the bars of a cage to permit elevation of the waterer as the birds grow. This example of a poultry watering system required that it be mounted onto parallel cage bars and not on other models of rearing container. U.S. Pat. No. 5,765,506 to Hawk & Cron, further disclosed a watering device wherein drinking heads or nipples are mounted to a moveable frame that may be automatically height adjusted by a wire and pulley system driven by a motor. This system incorporates a complex mechanism for driving the upward or downward movement of the frame and drinking heads that does not accommodate to a box-like bird container nor easily cleanable.

What is still needed, therefore, is a liquid delivery system for caged growing animals that can be readily adjusted for the increase in height of the birds with reduced labor input, which obviates the labor intensive current practice of detaching each water delivery head from the bird container and reattaching it at a higher position more convenient for the birds. What is also needed is an adjustable liquid delivery system that may be used on a variety of animal rearing containers, of simple construction that may be dismantled for cleaning.

SUMMARY OF THE INVENTION

Citation or identification of any document in this application is not an admission that such document is available as prior art to the present invention.

The present invention provides adjustable liquid delivery assemblies suitable for supplying the liquid needs of growing caged animals, especially poultry. The assemblies of the invention are suitable for mounting to, or being an integral part of, an animal enclosure such that the height of a valve-controlled liquid outlet may be adjusted according to the changing needs of growing animals. It may optionally be mounted to adjust the position of liquid delivery heads horizontally.

The present invention encompasses, therefore, adjustable liquid delivery assemblies for delivering a liquid to an animal, the assembly comprising an elongated rail, a liquid delivery unit having at least one liquid delivery head, said liquid delivery unit being slideably engaged with the elongated rail, a flexible liquid delivery tube for operably connecting a liquid delivery head to a liquid source, and a means for securing the liquid delivery unit at a selected position on the elongated rail. In this aspect of the invention, the liquid delivery system according to the invention may further comprise a retaining rail, wherein the elongated and retaining rails may be connected by at least one cross piece.

In embodiments of the invention, the elongated rail, the retaining rail and the at least one cross piece are molded as a single unit.

The liquid delivery unit may have has a plurality of liquid delivery heads, wherein each liquid delivery head may be operably connected to a flexible liquid delivery tube, or the liquid delivery head(s) is (are) operably connected to a manifold, the manifold being operably connected to the flexible liquid delivery tube.

The elongated rail bearing the liquid delivery unit may have any cross-section that can allow the unit to travel unimpeded along the rail. Advantageously, the cross-section may be selected from a T-shape, a rectangular shape, a triangular shape, and a circular or partial circular shape, and wherein the elongated rail engages with a similar cross-sectioned channel of the liquid delivery unit.

In the embodiments of the invention, an advantageous means for securing the liquid delivery unit at a selected position on the elongated rail comprises a linear series of holes disposed along the length of the elongated rail, each hole traversing the elongated rail, and a peg configured to pass through a hole of the series of holes, said peg having a proximal end and a distal end said distal end capable of extending beyond the elongated rail, thereby preventing the liquid delivery head from passing beyond the position of the peg. The means for securing the liquid delivery unit at a selected position on the elongated rail can also be selected from a frictional force between the elongated rail and the liquid delivery unit, a frictional force between the retaining rail and the liquid delivery unit, a spring, or a spring clamp. The spring or the spring clamp is attached to the liquid delivery unit.

The embodiments of the invention may further comprise a means to attach the liquid delivery assembly to an animal enclosure. The means to attach the liquid delivery assembly to an animal enclosure may comprise a securing member having a securing nut and bolt assembly or a spring clamp mounted thereon.

Another aspect of the invention, therefore, is animal containers, which can be, but is not limited to, a cage or a box comprising an adjustable liquid delivery assembly according to the invention.

While the adjustable liquid delivery assembly advantageously can be removable from the container, which facilitates cleaning and/or sterilization of the equipment between populations of the animals, in some embodiments of the invention, the elongated rail or the retaining rail is integrally molded with the container.

These and other embodiments are disclosed or are obvious from and encompassed by, the following Detailed Description.

BRIEF DESCRIPTION OF THE FIGURES

The following detailed description, given by way of example, but not intended to limit the invention solely to the specific embodiments described, may best be understood in conjunction with the accompanying drawings, in which:

FIG. 5A illustrates a rectangular rail cross-section and a retaining rail; FIG. 5B illustrates a T-shaped rail cross-section and a retaining rail; FIG. 5C illustrates a partial circular rail cross-section; and FIG. 5D illustrates a slotted T-shape rail cross-section.

FIG. 6A illustrates a rectangular rail cross-section and a retaining rail, wherein a peg passes through a hole in the elongated rail and the liquid delivery unit rests on the protruding end of the peg; FIG. 6B illustrates a rectangular rail cross-section and a retaining rail, wherein a peg passes through a hole in each rail and the liquid delivery unit rests on the peg; FIG. 6C illustrates a circular rail cross-section, wherein a peg passes through a hole in the rail and the liquid delivery unit rests on the peg; FIG. 6D illustrates a illustrates a T-shaped rail cross-section and a retaining rail, wherein the liquid delivery unit is held in place along the elongated rail by a spring; FIG. 6E illustrates a side-elevation of a T-shaped rail cross-section and a retaining rail, wherein the liquid delivery unit is held in place along the elongated rail by a spring FIG. 7A illustrates a side elevation of an embodiment of an adjustable liquid delivery system where a liquid delivery unit engaged with an elongated rail is secured in position by a spring clamp.

FIG. 7B illustrates a plan view of the liquid delivery unit, a spring clamp attached thereto, clamping the unit to a circular elongated rail.

DETAILED DESCRIPTION OF THE INVENTION

Figure 1:
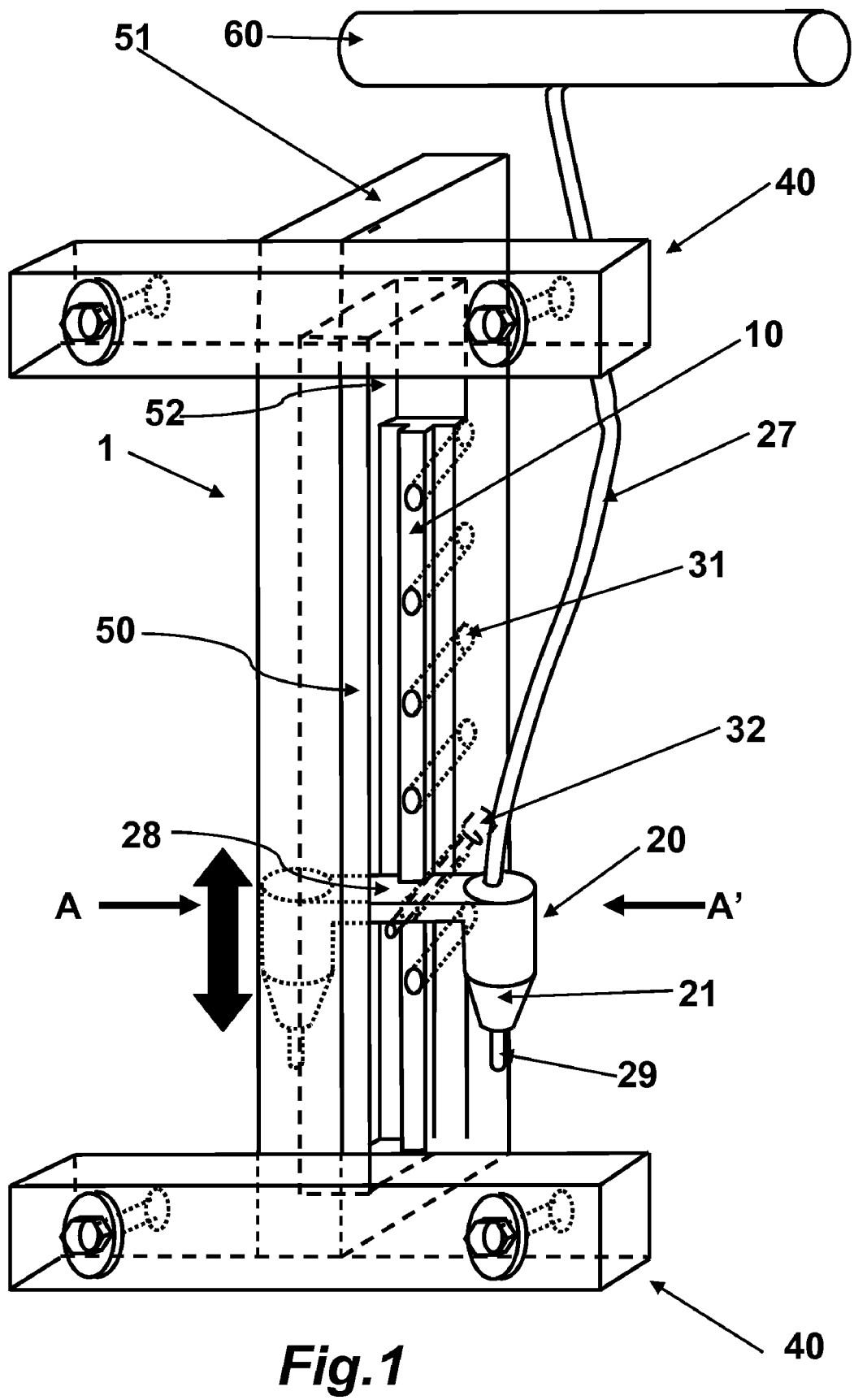
FIG. 1 illustrates an adjustable liquid delivery assembly wherein the position of a liquid delivery head is determined by the location of a securing peg. A,A' indicate a sectional plane through the system, including the liquid delivery unit.

As used herein, the following terms have the meanings ascribed to them unless specified otherwise. In this disclosure, "comprises," "comprising," "containing" and "having" and the like can have the meaning ascribed to them in U.S. patent law and can mean "includes," "including," and the like; "consisting essentially of" or "consists essentially" likewise has the meaning ascribed in U.S. patent law and the term is open-ended, allowing for the presence of more than that which is recited so long as basic or novel characteristics of that which is recited is not changed by the presence of more than that which is recited, but excludes prior art embodiments.

The present invention provides adjustable liquid delivery assemblies suitable for supplying the liquid needs of growing caged animals, especially poultry. The assemblies of the invention are suitable for mounting to, or being an integral part of, an animal enclosure such that the height of a valve-controlled liquid outlet may be adjusted according to the changing needs of growing animals. It may optionally be mounted to adjust the position of liquid delivery heads horizontally.

Referring now to FIGS. 1-11, as illustrated in FIGS. 1-4 for example, the present invention encompasses adjustable liquid delivery assemblies (1) comprising an elongated rail (10), a liquid delivery unit (20) slideably engaged thereon, a securing means (30) for holding the liquid delivery unit (20) at a selected position along the elongated rail (10), and a flexible liquid delivery tube (27) for conducting a liquid from a liquid source (60) to a liquid delivery unit (20), wherein the flexible liquid delivery tube (27) is operably connected to the liquid delivery unit (20) and the liquid source (60). A liquid delivery assembly (1) of the invention may further comprise an attaching means (40) for attaching the liquid delivery assembly (1) to an animal enclosure (41) such as a cage or rearing box, and a retaining rail (50) for preventing the liquid delivery unit (20) from detaching from the liquid delivery assembly (1).

Figure 5A:
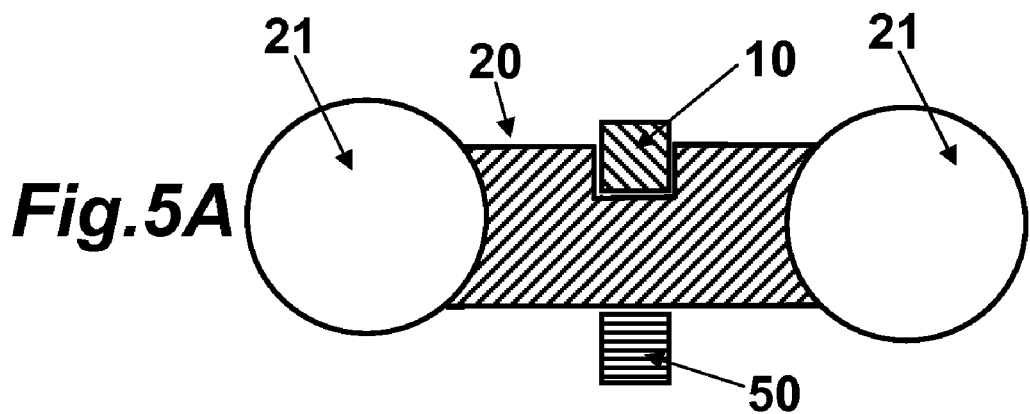
FIGS. 5A-5D illustrate cross-sections through embodiments of the elongated rail engaged with a liquid delivery unit consisting of two liquid delivery heads located at opposing ends of a member. The plane of the sections corresponds to A,A' shown in FIG. 2.
Figure 5B:
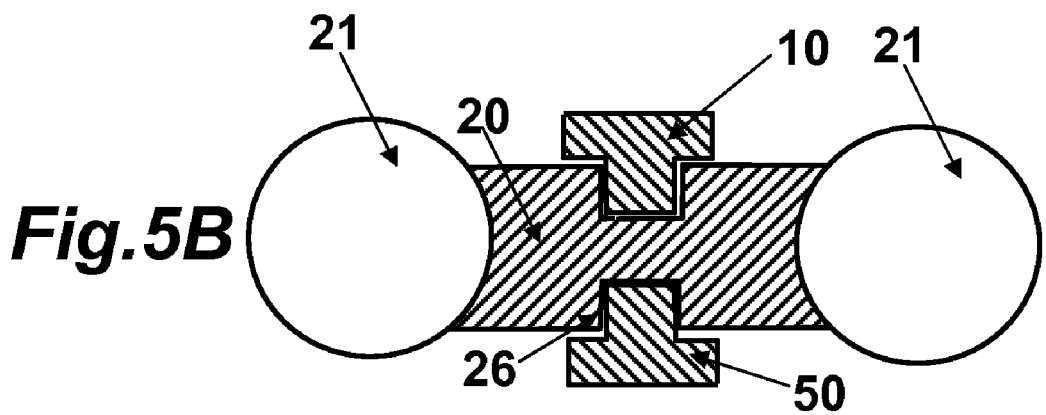
Figure 5C:
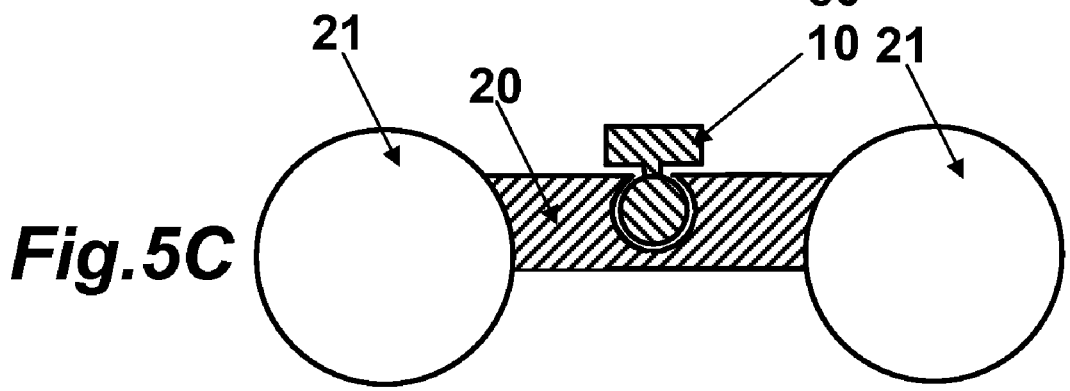
Figure 5D:
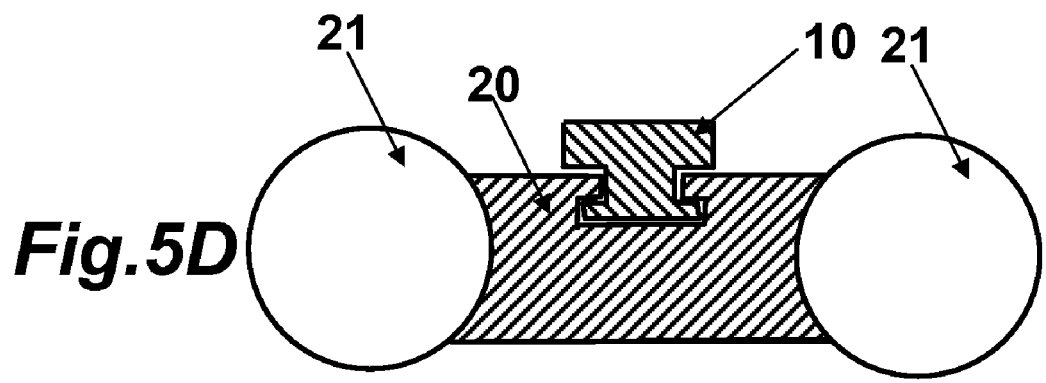

The elongated rail (10) may have any cross-section that allows a liquid delivery unit (20) engaged with the elongated rail (10) to slideably travel from one end of the elongated rail (10) to the other. For example, as illustrated in FIGS. 5A-5D, the elongated rail (10) may have, but is not limited to, a rectangular (FIG. 5A), a T-shape (FIG. 5B), a partial circular (FIG. 5C) or a slotted (FIG. 5D) cross-section. The cross-section of the elongated rail (10) may also be configured to prevent the slideable liquid delivery unit (20) from detaching from the elongated rail (10), as shown in FIGS. 5C and 5D. For example, FIG. 5C illustrates a rail in the form of a circular cross-section rod engaged with a circular channel (24) in the liquid delivery head. FIG. 5D illustrates a cross-section of an elongated rail (10) having a T-cross section tab (22) engaged with a similar T-cross-section channel (23) within the liquid delivery unit (20).

The adjustable liquid delivery system (1) may further comprise a retaining rail (50) for preventing disengagement of the liquid delivery unit (20) from the elongated rail (10), as illustrated, for example in FIGS. 1-6E. The retaining rail (50) is advantageously configured parallel to the elongated rail (10) as shown in FIGS. 1-4. A space (12) separating the two parallels rails (10, 50) allows travel of the liquid delivery unit (20) along the elongated rail (10). It is contemplated that the retaining rail (50) may positioned such that it can gently press against the liquid delivery unit (20), as shown, for example, in FIG. 2, which is, therefore, maintained in an upright position and does not become disengaged from the elongated rail (10). In other embodiments of the invention, the retaining rail (50) may slideably engage with a channel (26) in the liquid delivery unit (20) allowing freedom for the liquid delivery unit (20) to travel along the elongated rail (10) as illustrated, for example in FIGS. 5A-5D.

In the various embodiments of the liquid delivery assembly (1) of the invention, the elongated (10) and retaining (50) rails may be held in a fixed configuration relative to each other by cross extensions (51) that may be individual pieces attached to the opposing ends of each rail. Alternatively, as shown in FIGS. 1-3B, the elongated rail (10), the retaining rail (50) and the cross extensions (51) may be molded as a single assembly. In this embodiment, it is advantageous to foreshorten one or both of the parallel rails (10, 50) thereby providing an enlarged space (52) that can allow removal of the liquid delivery unit (20) from the elongated rail (10).

The liquid delivery head (21) of the invention may comprise any valve-regulated system suitable for the delivery of liquid, in particular water, according to the demands of an animal. Such heads are known to those in the art. Especially advantageous for the present invention is a gravity valve head of a size appropriate for use by poultry. In this head, water is delivered to an outlet via a weighted valve (29) extending from the liquid delivery head (21) that is held in a closed position to block the water flow by its own weight or with the aid of a spring. The animal, when desiring a drink, pushes the weighted valve to release the liquid flow. When the drinking has stopped and pressure applied by the animal is released, the weighted valve (29) descends under gravity and back into a liquid flow blocking position.

Figure 10A:
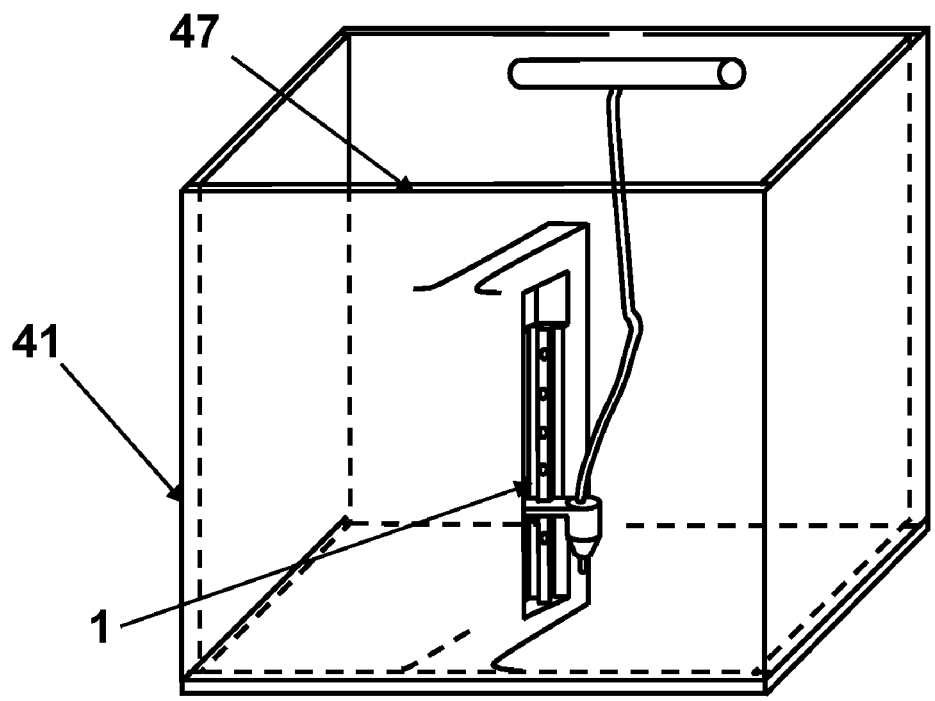
FIG. 10A illustrates an adjustable liquid delivery system molded integrally with the wall of an animal container.
Figure 10B:
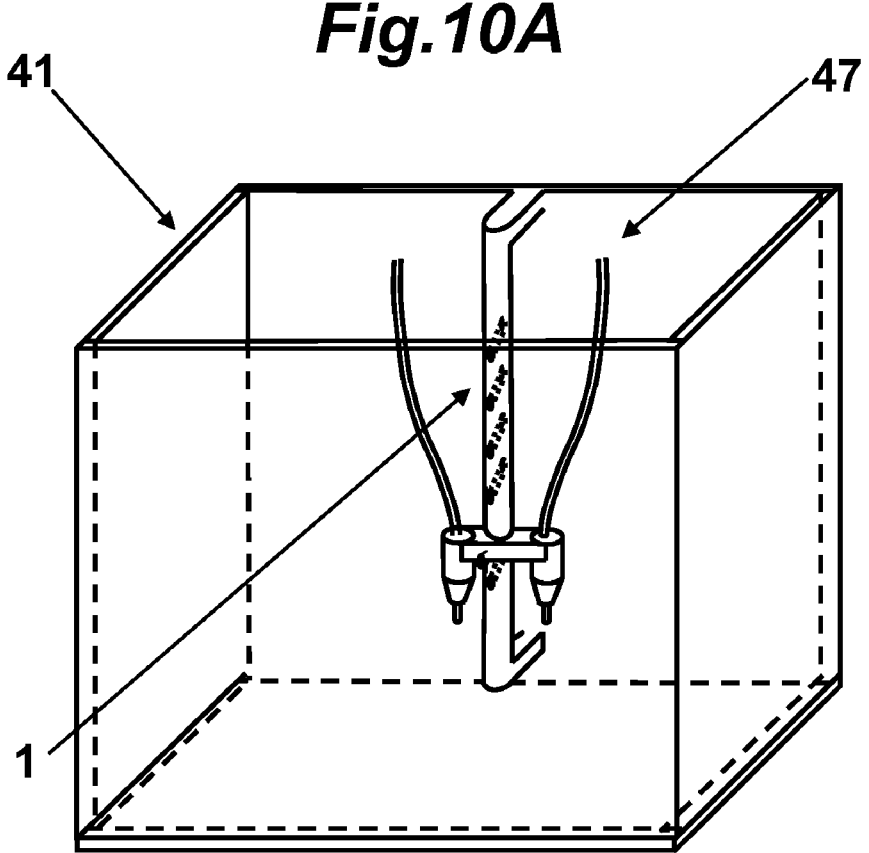
FIG. 10B illustrates an adjustable liquid delivery system wherein the liquid delivery unit is engaged with a circular rod-like elongated rail molded integrally with the wall of an animal container, and the individual liquid delivery heads are supplied with liquid.

A liquid delivery unit (20) may comprise a single liquid delivery head (21). Most advantageously, to supply liquid to a flock of caged birds, for example, the liquid delivery unit (20) may have a plurality of delivery heads, as shown in FIG. 1. Each liquid delivery head (21) may be individually connected to a liquid supply (60) by a flexible delivery tube (27) (as illustrated in FIG. 10B, for example) of sufficient length to allow the liquid delivery unit(s) (20) to travel unimpeded along the entire length of the elongated rail (10). Alternatively, a plurality of liquid delivery heads (21) may be operably connected to a manifold (28) connected to the liquid supply (60) by a single flexible delivery tube (27) as illustrated, for example, in FIG. 1. In this embodiment, the liquid may be delivered first to the manifold (28) from which it can pass to the weighted valve (29) of each liquid delivery head (21). The number and size of the delivery liquid delivery head(s) (21) is advantageously selected according to the type, size and number of animals drinking from the assembly.

The adjustable liquid delivery assemblies (1) of the invention further comprise a means (30) for securing the liquid delivery unit (20) at a selected position along the elongated rail (10). Referring now to FIGS. 3A and 3B, for example, one embodiment of the securing means (30) comprises a first linear array (35) of holes (31) that traverse the elongated rail (10) and in the direction of the liquid delivery head (21). A removable peg (32) having a proximal end (33) and a distal end (34) may be inserted distal end (34) first into and through a selected hole (31) of the first linear array (35). The distal end (34) of the peg (32) may then protrude from the hole (31), beyond the rail (10) in the direction of the liquid delivery unit (20) and into the space (12) (FIG. 3A).

Figure 6A:
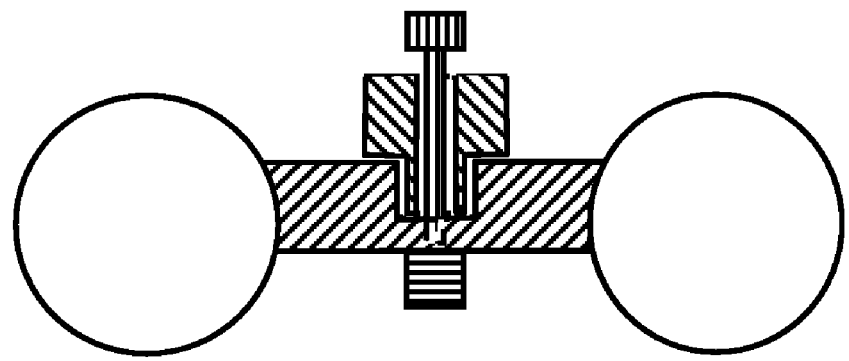
FIGS. 6A-6E illustrate cross-sections through embodiments of the elongated rail engaged with a liquid delivery unit consisting of two liquid delivery heads located at opposing ends of a member. The plane of each section corresponds to B,B' shown in FIG. 2.

When the liquid delivery assembly (1) is mounted to an animal cage or container in a vertical orientation, as illustrated in FIGS. 1, 3A and 3B, the peg (32) can be inserted through a selected hole (31). The liquid delivery unit (20) can then rest on the distal end (34) of the peg (32) extending into the space (12) as shown in FIGS. 3A and 6A. If the location of the liquid delivery unit (20) along the elongated rail (10) is to be altered, the peg (32) is withdrawn from the hole (31) and inserted through and extended from another hole (31) of the first linear array (35) and the liquid delivery unit (20) again allowed to rest on the protruding distal end (34). By progressively moving the peg (32) to an ever-higher hole (31) of the first linear array (35), the liquid delivery unit (20) can be raised with the minimum of effort to accommodate growing animals.

Figure 6B:
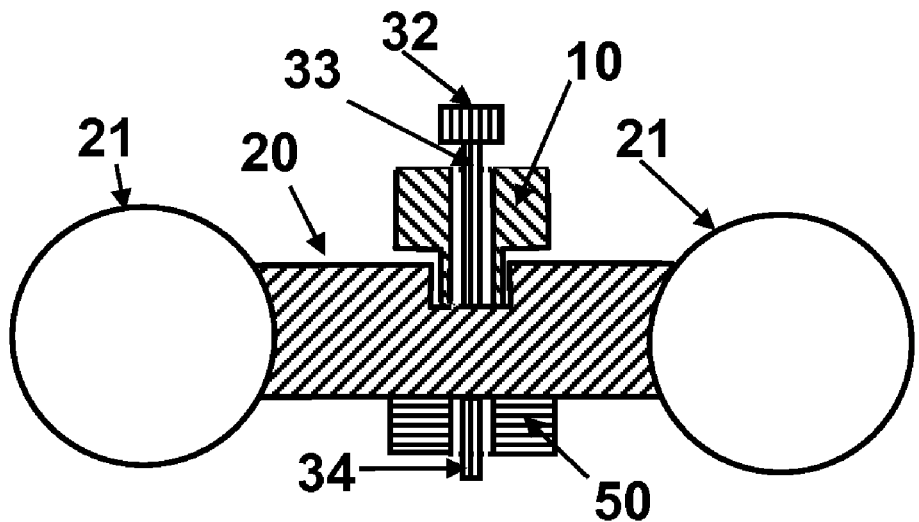
Figure 6C:
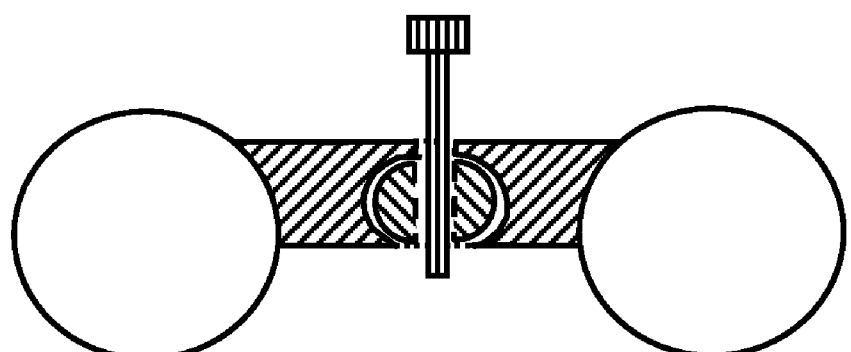

The liquid delivery assembly (1) of the invention may further comprise a second linear array (36) of holes (31) distributed along the length of the retaining rail (50). Each hole (31) of the second linear array (36) coaxially opposing a hole (31) of the first linear array (35), as illustrated in FIGS. 3B and 6B. In this embodiment of the liquid delivery unit (20) securing means (30), once the peg (32) is inserted through a traversing hole (31) of the elongated rail (10), the distal end (34) of the peg (32) is inserted into the opposing and corresponding hole (31) in the retaining rail (50), thus providing a barrier to the liquid delivery unit (20) advancing along the elongated rail (10) and beyond the peg (32).

Other embodiments of the liquid delivery head securing means (30) may be considered within the scope of the present invention. For example, but not limiting, the liquid delivery unit (20) may have a spring clamp assembly (70) attached thereto as illustrated in FIGS. 7A and 7B. The spring clamp assembly (70) may comprise a pivoted arm (71) having a gripping end (72) and an operating end (73). The pivoted arm (71) further comprises a pivot or hinge (74) operably mounted on a mounting frame (75) and which allows the pivoted arm (71) to reciprocally pivot in the direction shown by bold arrows A and B of FIG. 7A. A spring (76) or other elastic material connects the mounting frame (75) or liquid delivery unit (20) the pivoted arm (71) such that tension within the spring (76) compresses the gripping end (72) of the pivoted arm (71) against the elongated rail (10) and prevents movement of the liquid delivery unit (20) along the elongated rail (10).

When the operating end (73) of the pivoted arm (71) is depressed, thereby extending the spring (76), the gripping end (72) of the pivoted arm (71) separates from the elongated rail (10), freeing the liquid delivery unit (20) to slide along the elongated rail (10) to a selected position. Pressure is then released from operating end (73) whereupon the gripping end (72) is pulled by the extended spring (76) so that it again presses against the elongated rail (10) to hold the liquid delivery unit (20) in place.

Another embodiment of the delivery unit securing means (30) comprises the frictional force between the elongated rail (10) and the liquid delivery unit (20). Advantageously, the elongated rail (10) and region of the liquid delivery unit (20) in contact with the elongated rail (10) may be machined to provide sufficient gripping by the liquid delivery unit (20) against the elongated rail (10) to retain the liquid delivery unit (20) at the desired position along the elongated rail (10).

Figure 6D:
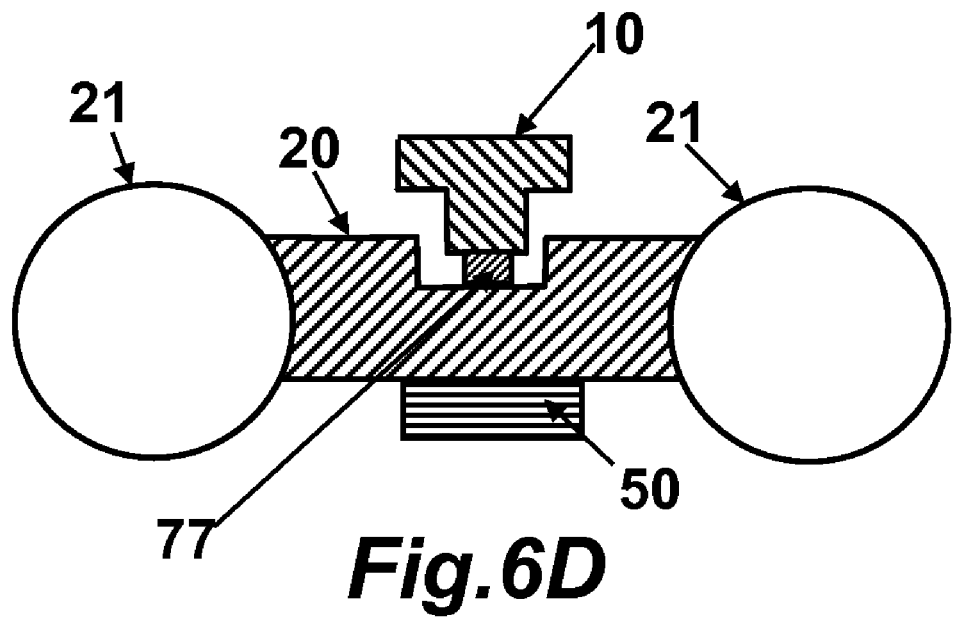
Figure 6E:
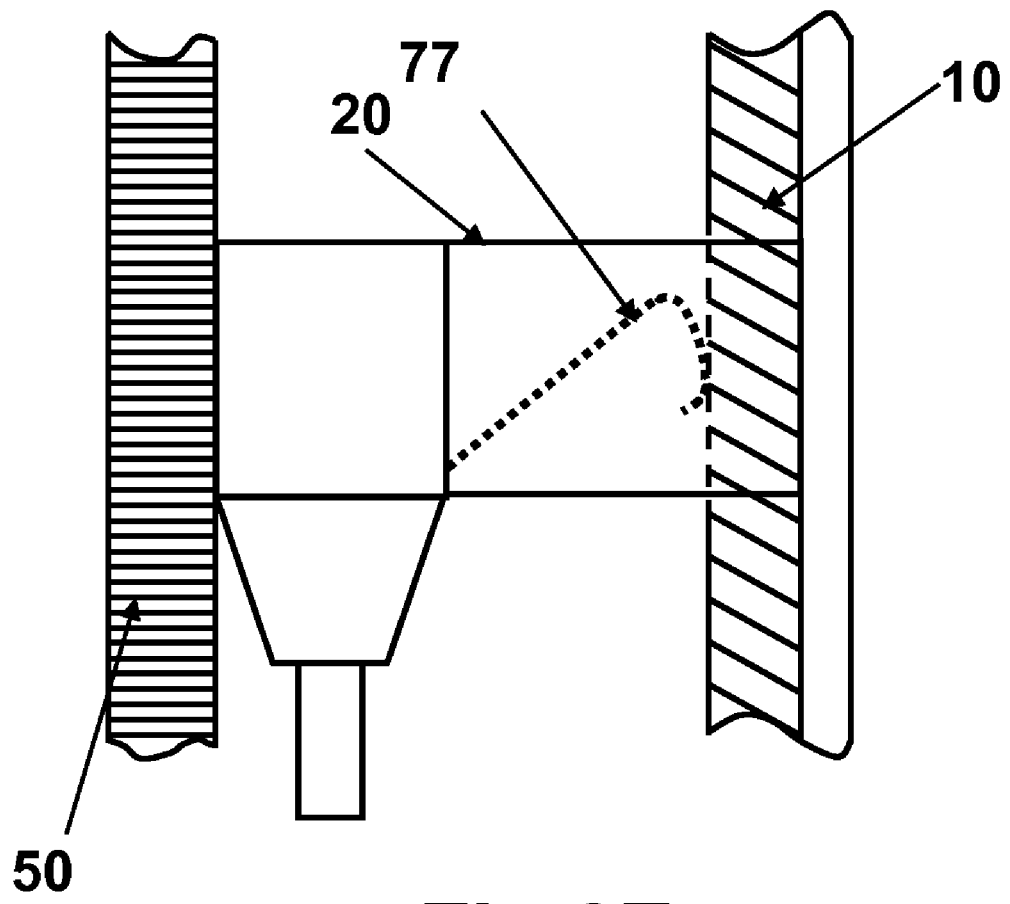

Yet another embodiment of the securing means (30), and illustrated in FIGS. 6D and 6E, is a spring (77) having a first end attached to the liquid delivery unit (20) and a second end disposed to push against the elongated rail (10) engaged with the liquid delivery unit (20). If the elongated rail (10) is in the form of a T-cross-section engaged with a T-channel in the liquid delivery unit (20), the spring (77) will provide sufficient frictional force to hold the unit in position along the elongated rail (10). Alternatively, the force of the spring pushes the liquid delivery unit (20) against a retaining rail (50), again providing sufficient frictional force to hold the unit in position along the elongated rail (10). In this embodiment, the liquid delivery unit (20) may be relocated along the elongated rail, by applying force in the desired direction of travel.

Figure 2:
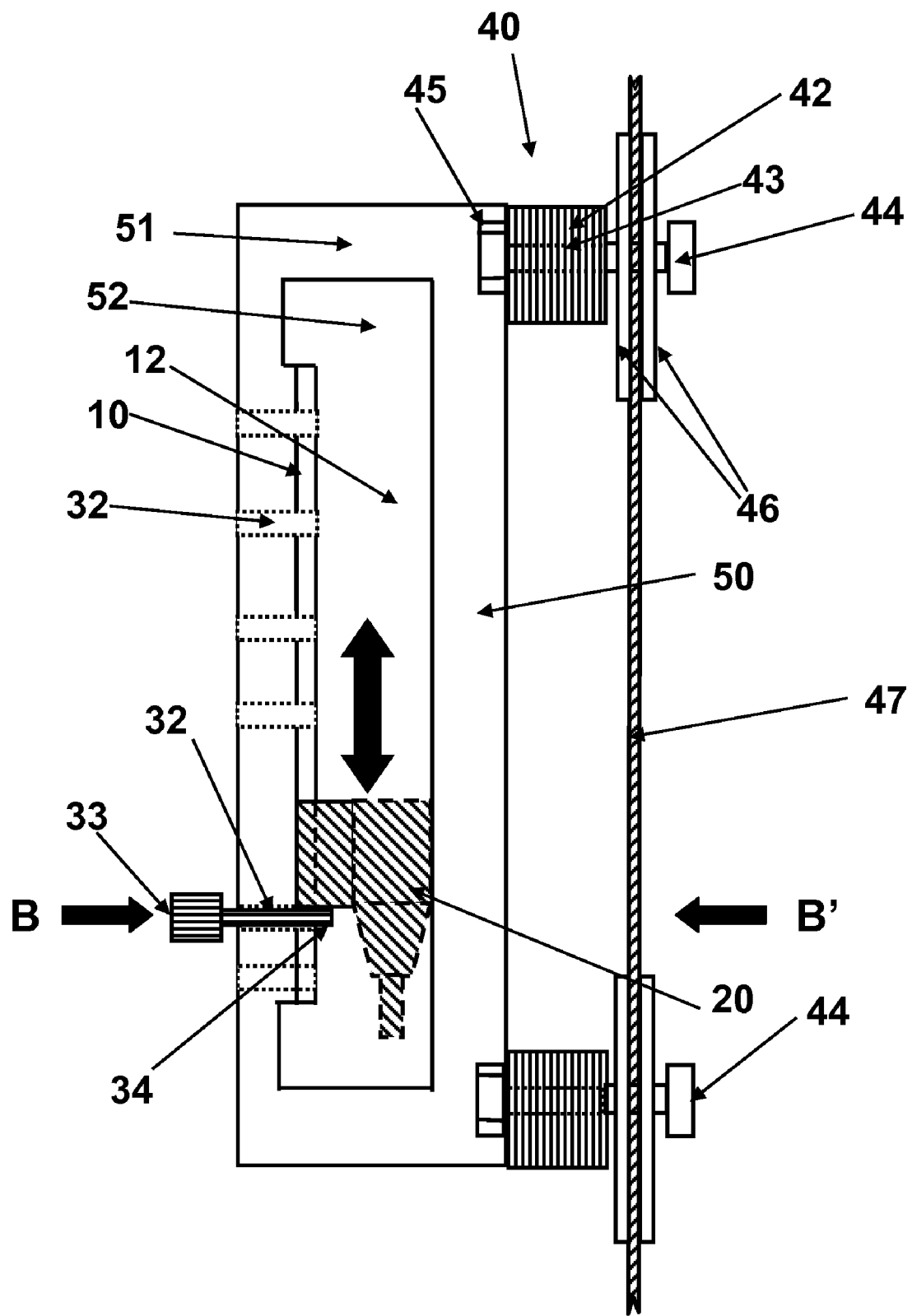
FIG. 2 illustrates a side elevation of a liquid delivery system wherein an elongated rail, a retaining rail and connecting arms are molded as a single unit and attached to an attachment means for securing the system to an animal enclosure.
Figure 3:
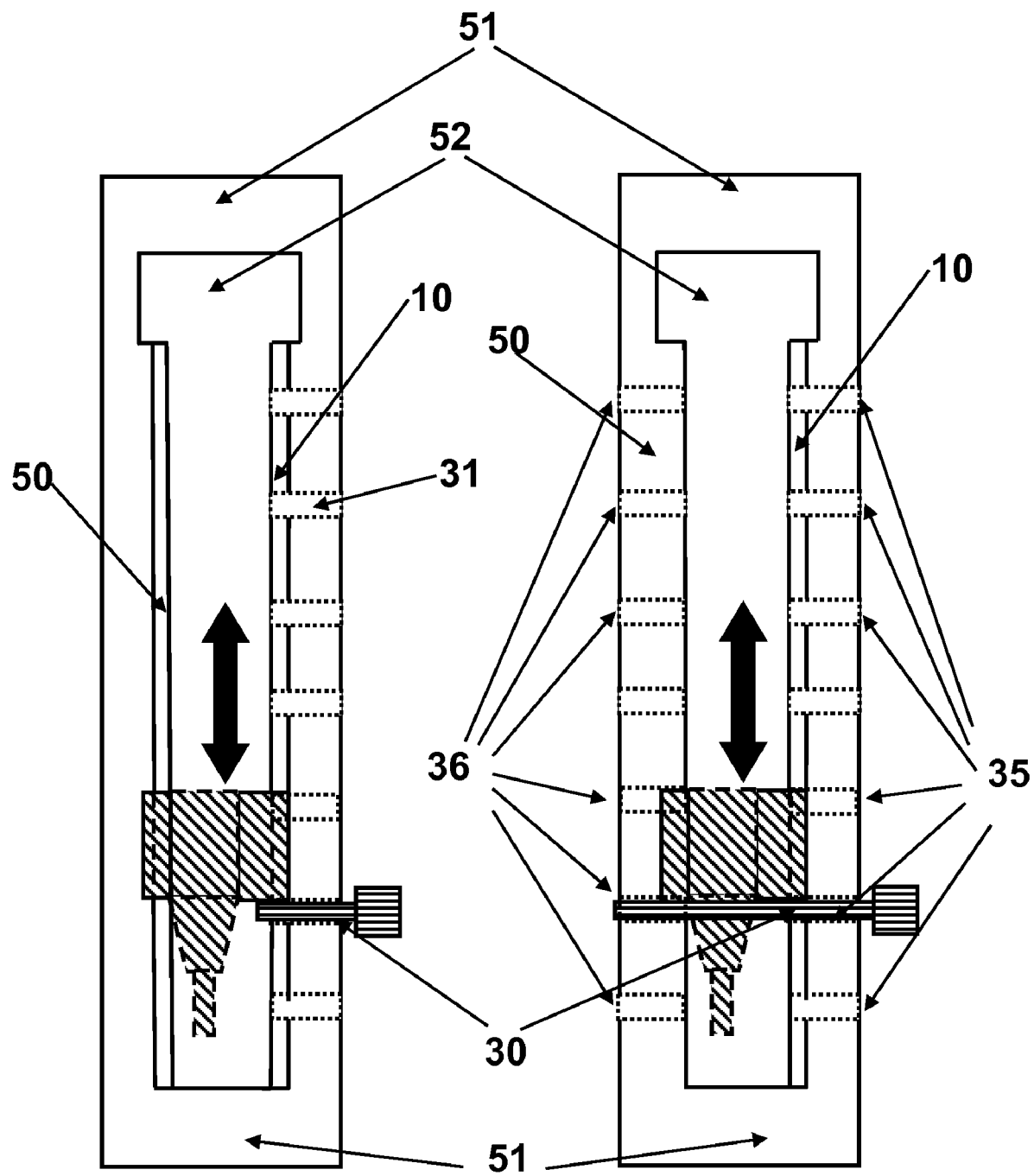
FIG. 3A illustrates a side elevation of a liquid delivery system wherein an elongated rail, a retaining rail and connecting arms are molded as a single unit and the liquid delivery unit has a channel engaging with the retaining rail, a single array of holes in the elongated rail and a peg engaged therein.
FIG. 3B illustrates a side elevation of a liquid delivery system wherein an elongated rail, a retaining rail and connecting arms are molded as a single unit and the liquid delivery unit has a channel engaging with the retaining rail and linear arrays of holes in the elongated rail and the retaining rail, wherein the peg engages a hole in each array.
Figure 4:
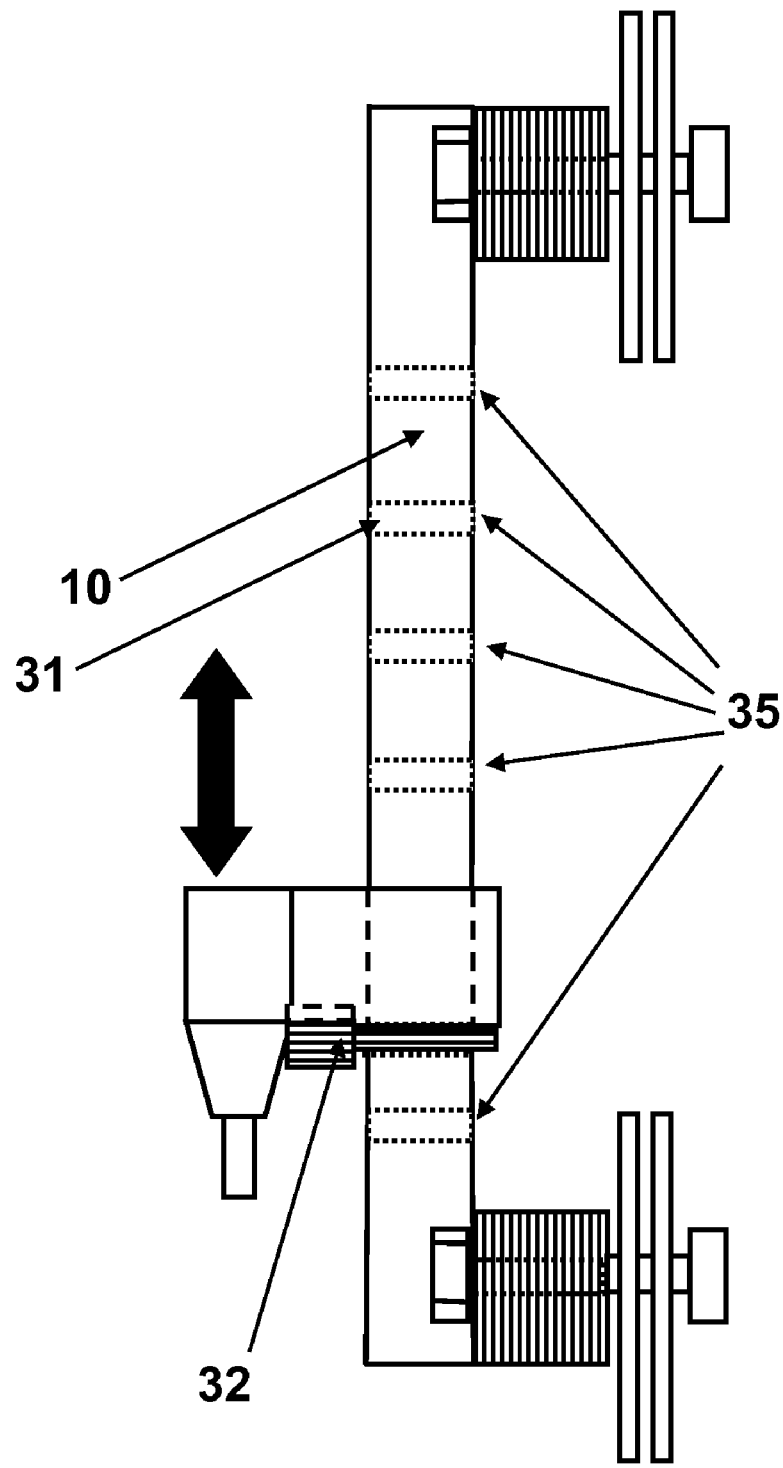
FIG. 4 illustrates a side elevation of a liquid delivery system wherein the elongated rail is a circular rod.
Figure 8A:
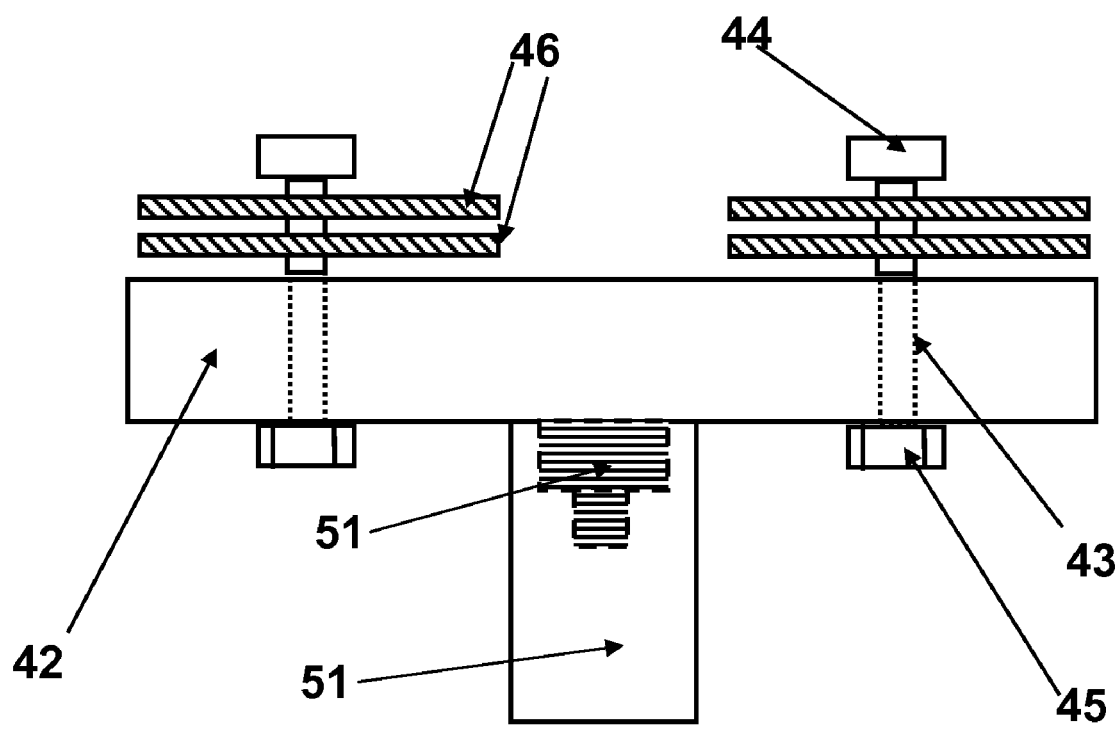
FIG. 8A illustrates a plan view of bolt, nut and washer securing means for attaching an adjustable liquid delivery system to an animal container or cage.

The liquid delivery assemblies (1) of the present invention may further comprise an attachment means (40) to attach a liquid delivery assembly (1) to an animal enclosure (41), which may be, but is not limited to, a box with walls, or a cage, whereupon the attachment means (40) attaches to a wall or at least one cage bar. Referring now to FIGS. 1, 2, 4, 8A and 8B, the attachment means (40) may comprise at least one support member (42) having at least one traversing hole (43), a bolt (44) extending through said hole (43) and a retaining nut (45) operably threaded on said bolt (44). The bolt (44) may optionally further have at least one washer (46), or advantageously two washers (46) located thereon as shown in FIGS. 2 and 8A. The two washers (46) may sandwich a wall (47) of the animal enclosure (41), as illustrated in FIG. 2, and be secured thereto by tightening of the bolt (44) and nut (45) combination, said bolt (44) passing through a hole in the container wall (47). This embodiment may also be secured to a cage by clamping one or more of the cage bars (49) between the compressed washers.

Figure 8B:
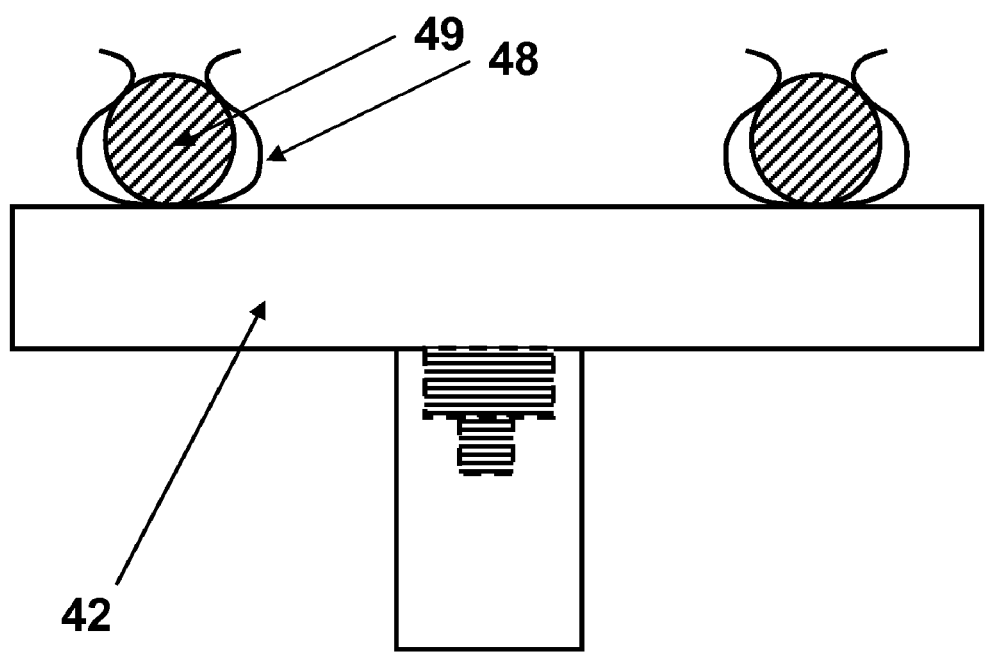
FIG. 8B illustrates a plan view of a spring clip securing means for attaching an adjustable liquid delivery system to an animal container or cage.
Figure 9:
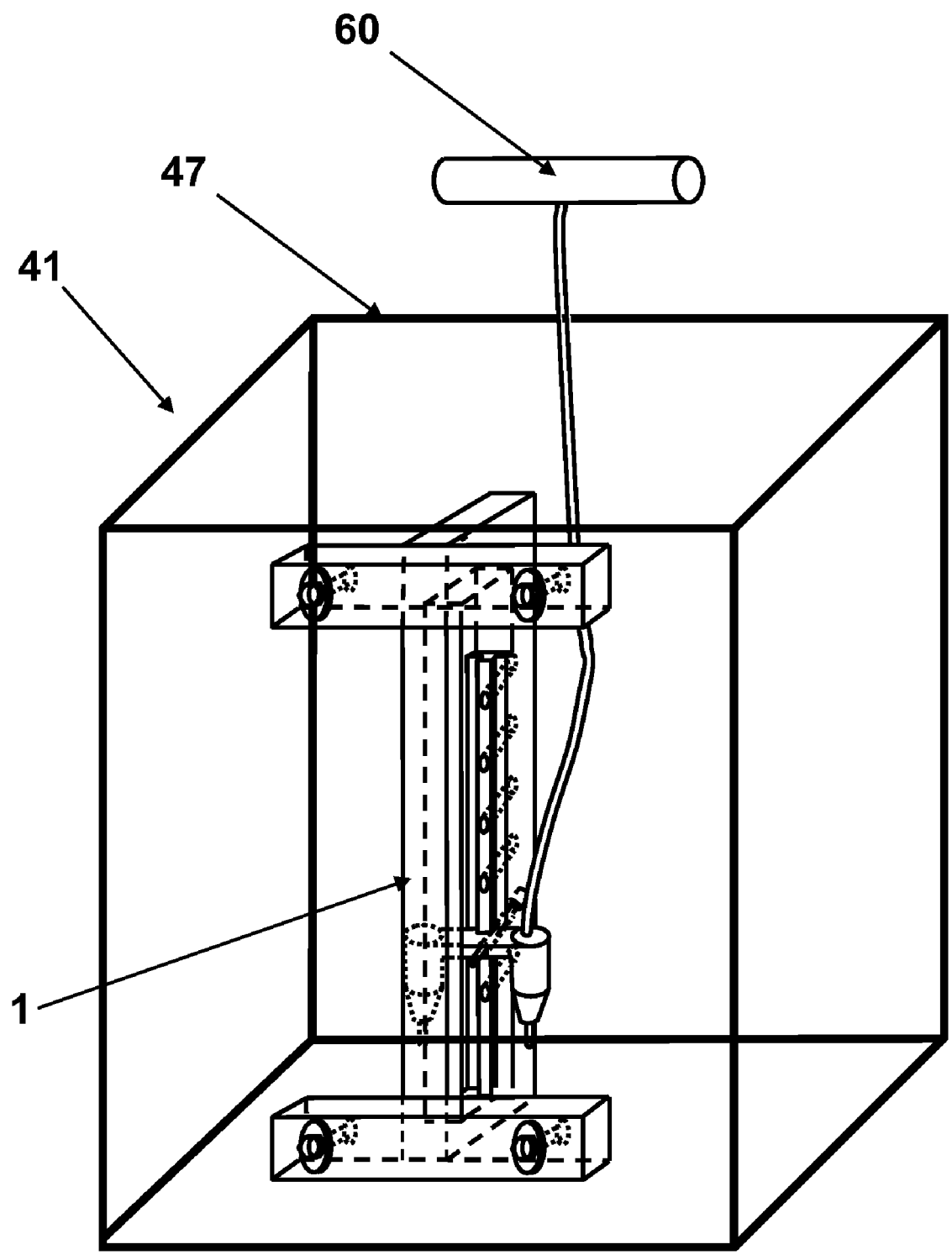
FIG. 9 illustrates a liquid delivery system attached to the wall of an animal container by sandwiching the wall between two compressed washers.

Yet another embodiment of the liquid delivery assembly securing means (40) comprises at least one spring clip (48), as illustrated in FIG. 8B that may be attached to a cage bar (49). It is contemplated, however, that the invention is not limited to assembly securing means as illustrated in the figures herein but that any suitable means, including adhesive, may be used that will securely attach the liquid delivery assembly of the invention to an animal container.

The liquid delivery assembly (1) of the invention can be constructed of any material(s) that is (are) acceptable to the animals with which it may be in contact. Most advantageously, the materials shall be able to tolerate cleaning processes including sterilization by chemicals, soap, steam washing or autoclaving. Advantageously, the liquid delivery assemblies (1) of the invention may be constructed of, but not limited to, inert plastics such as, but not limited to, polyethylene, nylon, polycarbonate or polyacrylic plastics and the like, a metal such as stainless steel or any combination thereof. Most advantageously, the components of the liquid delivery assembly (1) will be manufactured without acute corners, cavities and the like that have the potential to hinder cleaning and to accumulate detritus, or harbor material that may nourish or protect disease-causing agents such as bacteria and viruses.

Figure 11:
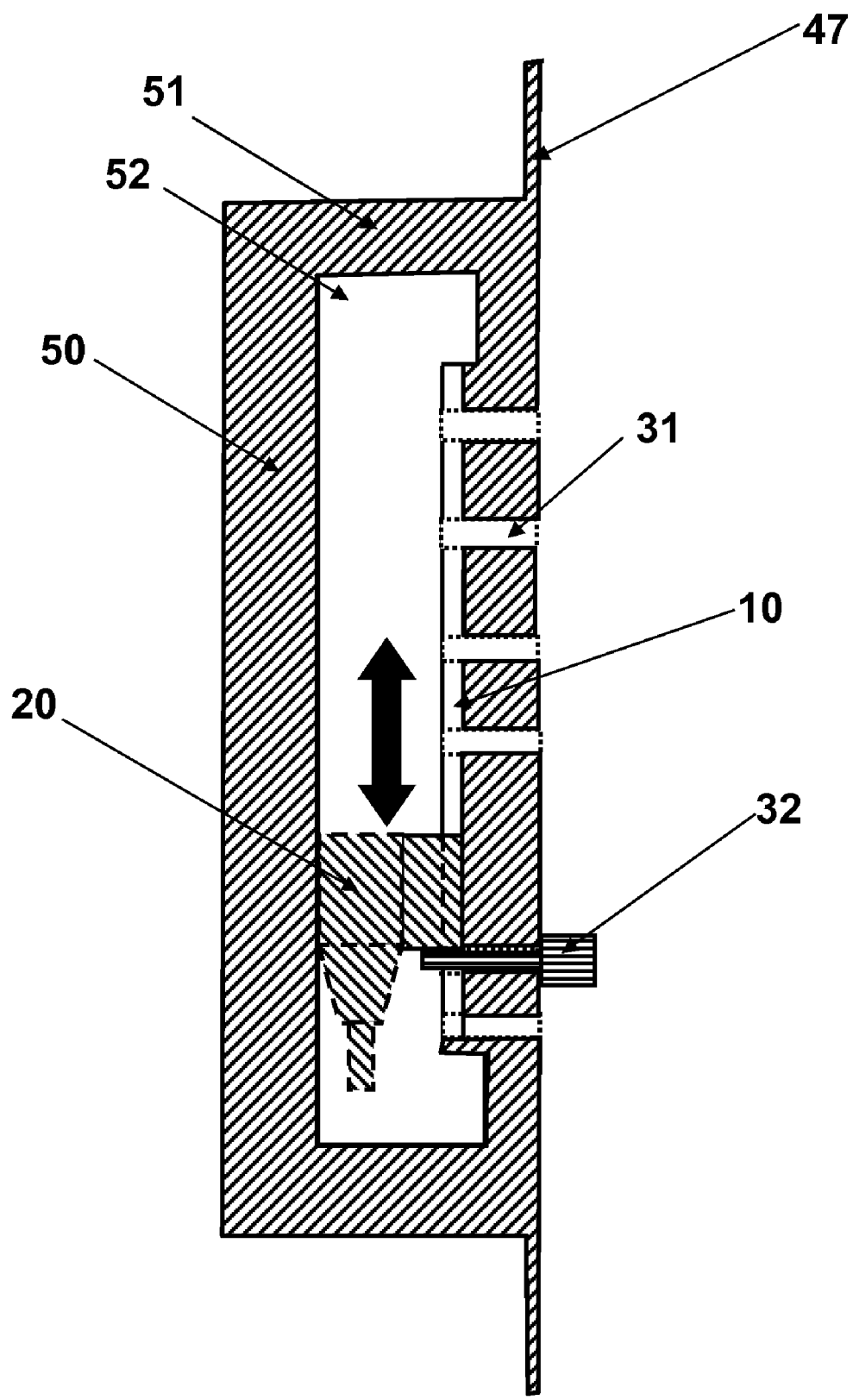
FIG. 11 illustrates a side-elevation of an adjustable liquid delivery system integrally molded with a wall of an animal container.

The invention also provides animal containers comprising a liquid delivery assembly (1) according to the invention integrally molded with the container. It is within the scope of the invention that the elongated rail (10) and/or the liquid delivery unit retaining rail (50) may be integrally molded with an animal container (41). Exemplary embodiments of such enclosures incorporating integrally molded rails are illustrated in FIGS. 10A and 10B. A side-elevation of such a liquid delivery system according to the invention is illustrated in FIG. 11. In these non-limiting embodiments, the animal container (41) may be a molded plastic box and the elongated rail (10) and retaining rail (50) are integral with one wall (47) of the animal container (41), extending therefrom and into the interior (48) of the animal container (41).

Figure 12:
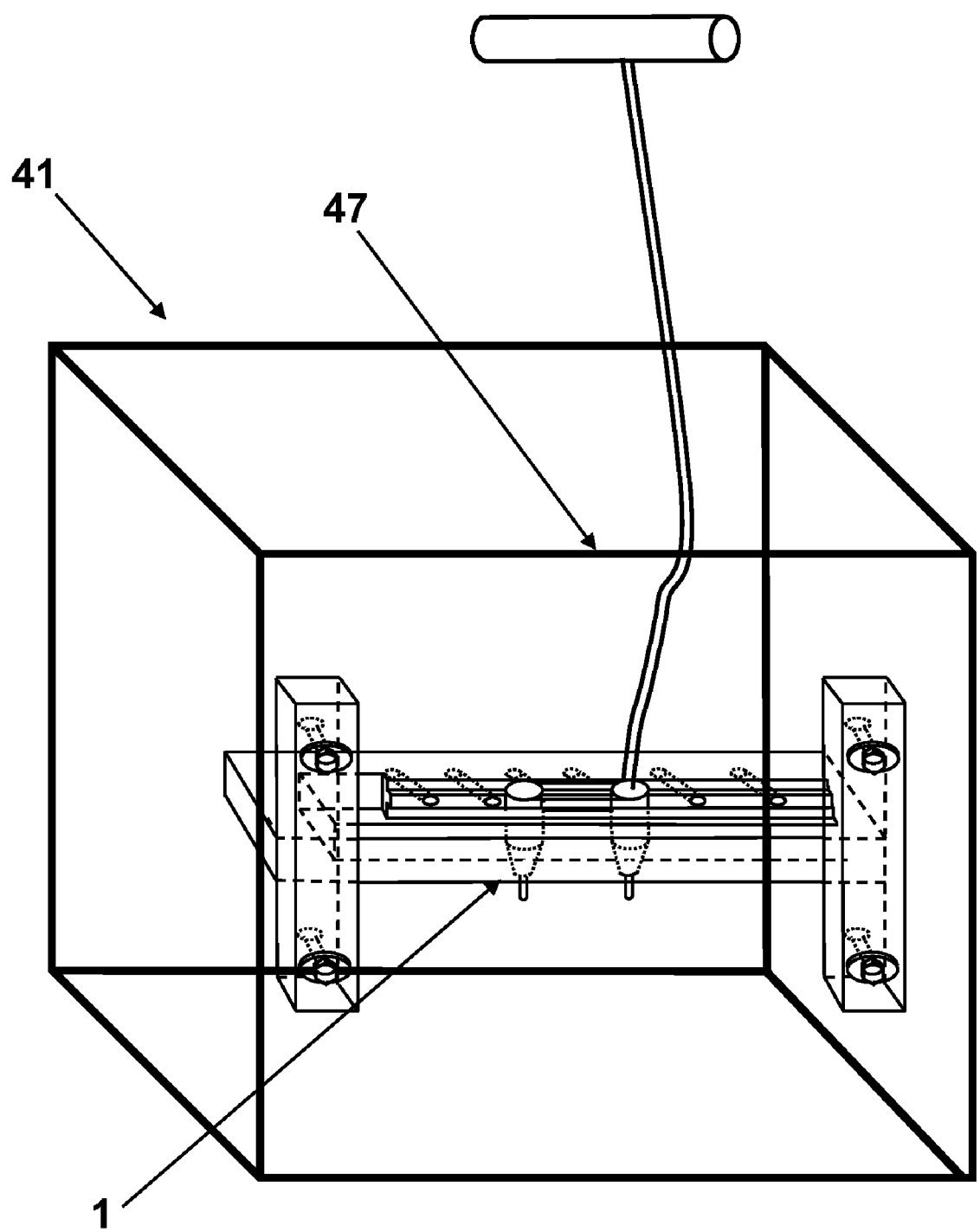
FIG. 12 illustrates a liquid delivery system attached horizontally to the wall of an animal container.

It is especially advantageous to vertically orientate an liquid delivery assembly (1) according to the invention when attached to an animal container. By relocating the liquid delivery unit (20) upwards along the elongated rail (10) drinking water may be delivered to a growing caged animal at a height convenient to the animal, which does not then have to crouch, bend or otherwise have difficulty in reaching the liquid outlet. It is not to be excluded, however, that the assembly according to the invention may be orientated horizontally, as shown in FIG. 12. In this embodiment of the invention, the position of the delivery head may be adjusted horizontally according to the desires of an animal keeper.

One aspect of the invention, therefore, provides an adjustable liquid delivery assembly for delivering a liquid to an animal, the assembly comprising an elongated rail, a liquid delivery unit having at least one liquid delivery head, said liquid delivery unit being slideably engaged with the elongated rail, a flexible liquid delivery tube for operably connecting a liquid delivery head to a liquid source, and a means for securing the liquid delivery unit at a selected position on the elongated rail.

In this aspect of the invention, the liquid delivery system according to the invention may further comprise a retaining rail, and wherein the elongated and retaining rails are connected by at least one cross piece.

In other embodiments of this aspect of the invention, the elongated rail, the retaining rail and the at least one cross piece are molded as a single unit.

One embodiment of the invention, the liquid delivery unit has a plurality of liquid delivery heads. In this embodiment of the invention, each liquid delivery head may be operably connected to a flexible liquid delivery tube or the liquid delivery head(s) is (are) operably connected to a manifold, said manifold being operably connected to the flexible liquid delivery tube.

In the embodiments of the invention, the elongated rail may have a cross-section selected from a T-shape, a rectangular shape, a triangular shape, and a circular or partial circular shape, and wherein the elongated rail engages with a similar cross-sectioned channel of the liquid delivery unit.

In the embodiments of the invention, the means for securing the liquid delivery unit at a selected position on the elongated rail comprises a linear series of holes disposed along the length of the elongated rail, each hole traversing the elongated rail, and a peg configured to pass through a hole of the series of holes, said peg having a proximal end and a distal end said distal end capable of extending beyond the elongated rail, thereby preventing the liquid delivery head from passing beyond the position of the peg.

In other embodiments of the invention, the means for securing the liquid delivery unit at a selected position on the elongated rail is selected from a frictional force between the elongated rail and the liquid delivery unit, a frictional force between the retaining rail and the liquid delivery unit, a spring, or a spring clamp.

In some embodiments of the invention, the spring or the spring clamp is attached to the liquid delivery unit.

The embodiments of the invention may further comprise a means to attach the liquid delivery assembly to an animal enclosure.

In one embodiment of the invention, the means to attach the liquid delivery assembly to an animal enclosure comprises a securing member having a securing nut and bolt assembly or a clamp mounted thereon.

Another embodiment of the invention is an adjustable liquid delivery assembly for delivering a liquid to an animal, the assembly comprising an elongated rail, a liquid delivery unit having at least one liquid delivery head, said liquid delivery unit being slideably engaged with the elongated rail, a flexible liquid delivery tube for operably connecting a liquid delivery head to a liquid source, a retaining rail, and a means for securing the liquid delivery unit at a selected position along the elongated rail, wherein the elongated and retaining rails are connected by at least one cross piece molded as a single unit and further comprising a space for removal of the liquid delivery unit from the assembly, and wherein the liquid delivery unit has a plurality of liquid delivery heads operably connected to a manifold, said manifold being operably connected to the flexible liquid delivery tube, wherein the elongated rail has a rectangular cross-section and the elongated rail slideably engages a similar cross-section channel of the liquid delivery unit, wherein the means for securing the liquid delivery unit at a selected position on the elongated rail comprises a linear array of holes disposed along the length of the elongated rail, each hole traversing the elongated rail, and a peg configured to pass through a hole of the series of holes, said peg having a proximal end and a distal end said distal end being capable of extending beyond the elongated rail, thereby preventing the liquid delivery head from passing beyond the position of the peg, and an attachment means to attach the liquid delivery assembly to an animal enclosure comprising a securing member having a securing nut and bolt assembly or a clamp mounted thereon.

Accordingly, another aspect of the invention is an animal container comprising an adjustable liquid delivery assembly according to the invention, and wherein the container is a cage or a box.

In various embodiments of this aspect of the invention, the adjustable liquid delivery assembly is removable from the container.

In other embodiments of this aspect of the invention, the elongated rail or the retaining rail is integrally molded with the container.

Although methods and materials similar or equivalent to those described herein can be used in the practice or testing of the present invention, suitable methods and materials are described herein. All publications, patent applications, patents, and other references mentioned herein are incorporated by reference in their entirety. In addition, the materials, methods, and examples are illustrative only and are not intended to be limiting.

The following examples are provided to describe and illustrate, but not limit, the claimed invention. Those of skill in the art will readily recognize a variety of non-critical parameters that could be changed or modified to yield essentially similar results.

What is claimed is:

1. An adjustable liquid delivery assembly for delivering a liquid to an animal, the assembly comprising:
    (a) an elongated rail,
    (b) a liquid delivery unit having at least one liquid delivery head, said liquid delivery unit being slideably engaged with the elongated rail,
    (c) a flexible liquid delivery tube for operably connecting a liquid delivery head to a liquid source,
    (d) a means for securing the liquid delivery unit at a selected position along the elongated rail; and
    wherein the liquid delivery unit has a plurality of liquid delivery heads; and
    wherein each liquid delivery head is individually operably connected to a flexible liquid delivery tube.

2. The assembly according to claim 1, further comprising a retaining rail.

3. The assembly according to claim 2, wherein the elongated and retaining rails are connected by at least one cross piece.

4. The assembly according to claim 3, wherein the elongated rail, the retaining rail and the at least one cross piece are molded as a single unit.

5. The assembly according to claim 1, wherein the liquid delivery heads are operably connected to a manifold, said manifold being operably connected to the flexible liquid delivery tubes.

6. The assembly according to claim 1, wherein the elongated rail has a cross-section selected from a T-shape, a rectangular shape, a triangular shape, and a circular or partial circular shape, and wherein the elongated rail slideably engages with a similar cross-section channel of the liquid delivery unit.

7. The assembly according to claim 1, wherein the means for securing the liquid delivery unit at a selected position on the elongated rail comprises a linear array of holes disposed along the length of the elongated rail, each hole traversing the elongated rail, and a peg configured to pass through a hole of the series of holes, said peg having a proximal end and a distal end said distal end being capable of extending beyond the elongated rail, thereby preventing the liquid delivery head from passing beyond the position of the peg.

8. The assembly according to claim 1, wherein the means for securing the liquid delivery unit at a selected position on the elongated rail is selected from a frictional force between the elongated rail and the liquid delivery unit, a frictional force between the retaining rail and the liquid delivery unit, a spring, or a spring clamp.

9. The assembly according to claim 8, wherein the spring or the spring clamp are attached to the liquid delivery unit.

10. The assembly according to claim 1 further comprising an attaching means to attach the liquid delivery assembly to an animal enclosure.

11. The assembly according to claim 10, wherein the attaching means comprises a securing member having a securing nut and bolt assembly or a clamp mounted thereon.

12. The assembly according to claim 10 wherein the means to attach the liquid delivery assembly to an animal enclosure comprises a securing member having a spring clamp mounted thereon.

13. An animal container comprising the adjustable liquid delivery assembly according to claim 1, wherein the container is a cage or a box.

14. The animal container according to claim 13, wherein the adjustable liquid delivery assembly is removable from the container.

15. The animal container according to claim 13, wherein the elongated rail or the retaining rail is integrally molded with the container.

* * * * *